(12) United States Patent
Kuntz

(10) Patent No.: US 8,267,078 B2
(45) Date of Patent: Sep. 18, 2012

(54) SYSTEM FOR CONVERTING A KETTLE-TYPE BARBECUE TO EMPLOY FUEL PELLETS

(76) Inventor: John Kuntz, Citrus Heights, CA (US)

(*) Notice: Subject to any disclaimer, the term of this patent is extended or adjusted under 35 U.S.C. 154(b) by 0 days.

(21) Appl. No.: 12/476,148

(22) Filed: Jun. 1, 2009

(65) Prior Publication Data

US 2010/0218754 A1 Sep. 2, 2010

Related U.S. Application Data

(63) Continuation-in-part of application No. 11/328,985, filed on Jan. 10, 2006, now abandoned.

(51) Int. Cl.
*A47J 37/07* (2006.01)
(52) U.S. Cl. .......... 126/7; 126/10; 126/11; 126/25 R
(58) Field of Classification Search .......... 126/7, 10, 126/11, 25 R, 501; 110/104 B, 105, 11, 108, 110/293, 294
See application file for complete search history.

(56) References Cited

U.S. PATENT DOCUMENTS

| | | | | |
|---|---|---|---|---|
| 4,823,684 A | * | 4/1989 | Traeger et al. | 99/447 |
| 5,144,939 A | * | 9/1992 | Christopherson | 126/25 R |
| 5,909,729 A | * | 6/1999 | Nowicke, Jr. | 126/25 R |
| 6,223,737 B1 | * | 5/2001 | Buckner | 126/25 R |
| 6,520,174 B1 | * | 2/2003 | Scigliuolo | 126/25 R |

* cited by examiner

*Primary Examiner* — Alfred Basichas

(57) ABSTRACT

An apparatus and method used with a conventional barbecue, such as a kettle-type barbecue, which enables the barbecue to be fueled by fuel pellets burned in a fire box. The apparatus includes a support, a hopper and feeder structure for the fire box combined into a unitary construction selectively positionable as a unit on the barbecue body of the barbecue or removed therefrom. In embodiments illustrated, the fire box is positioned so as to direct heat to a desired location within the apparatus.

21 Claims, 7 Drawing Sheets

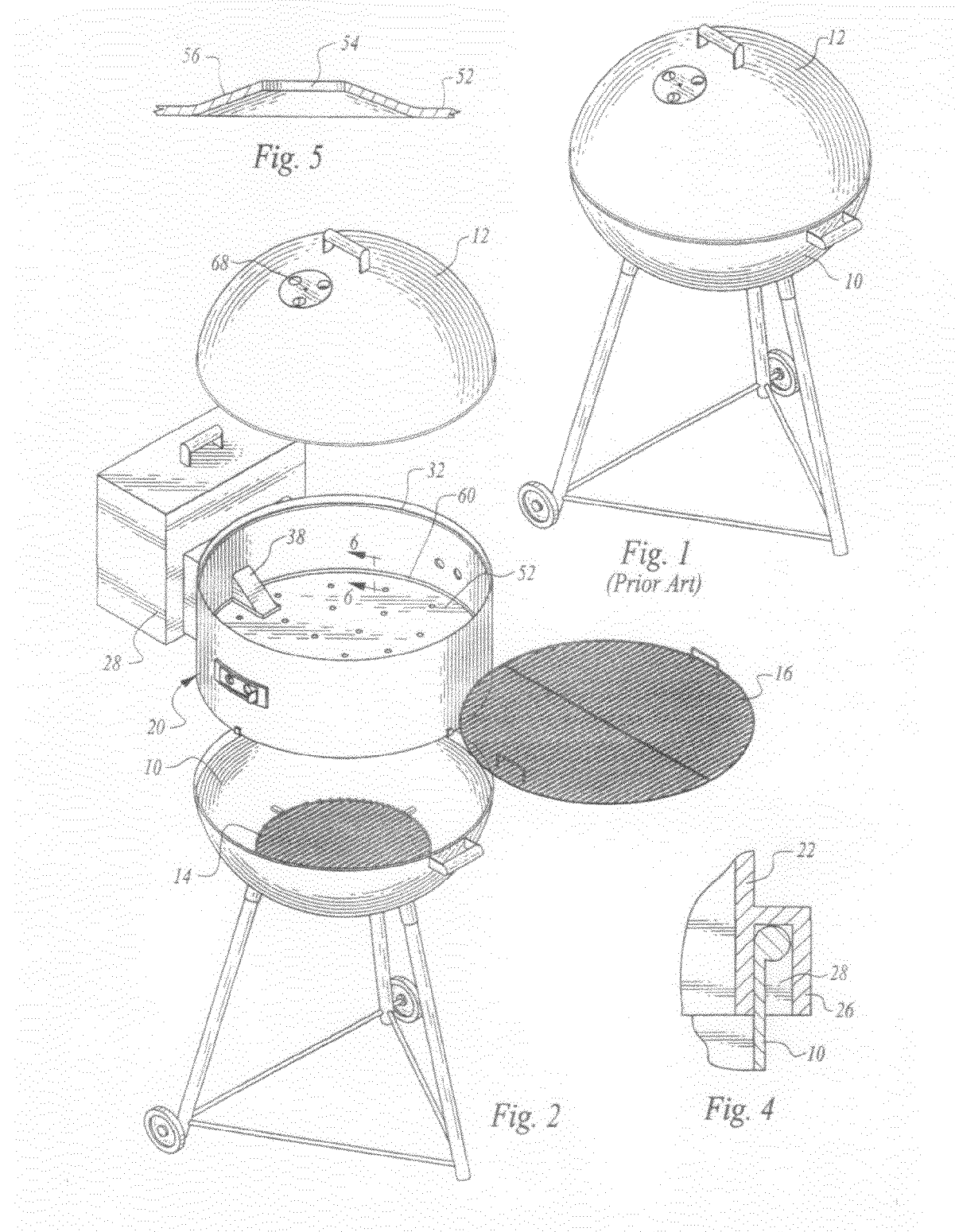

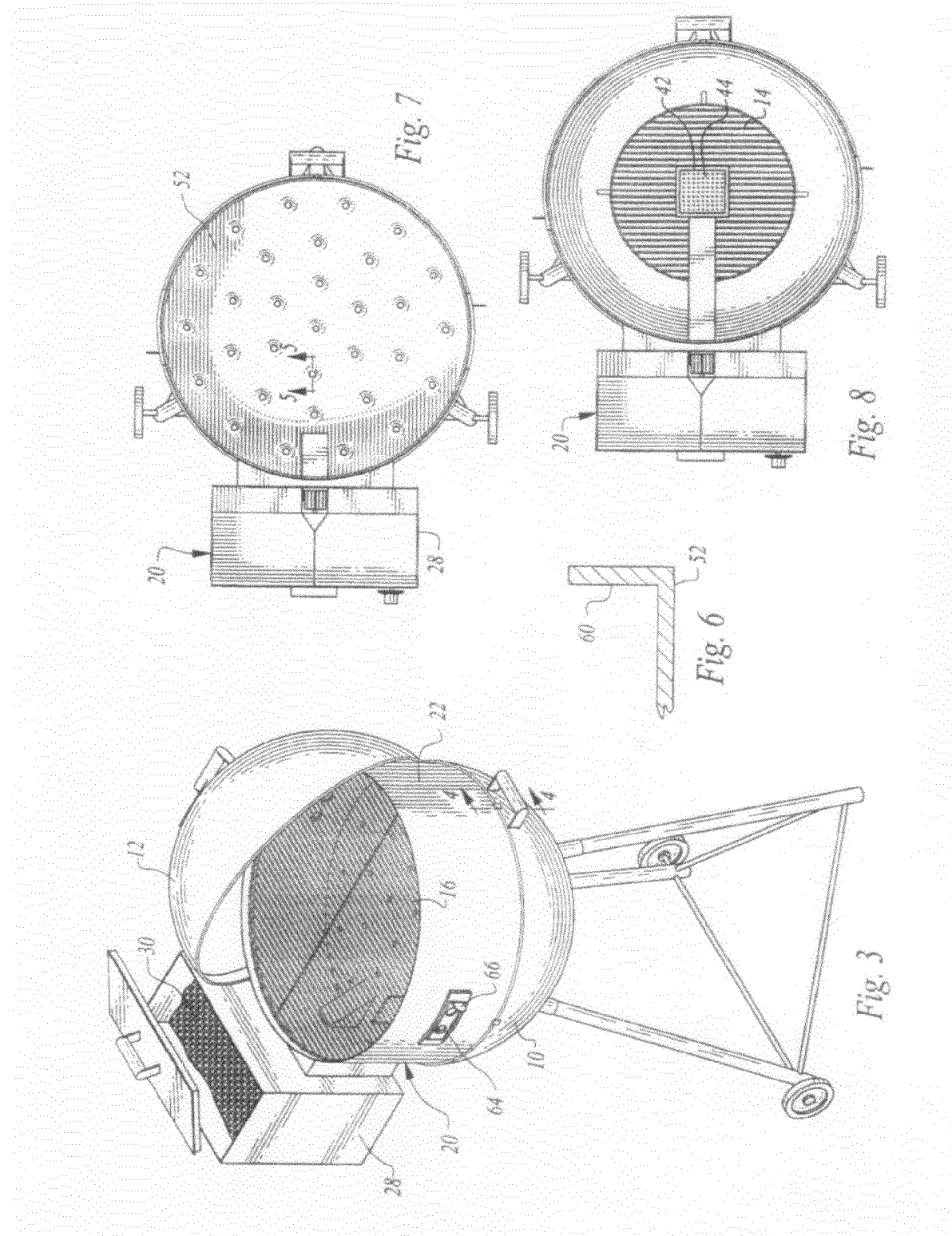

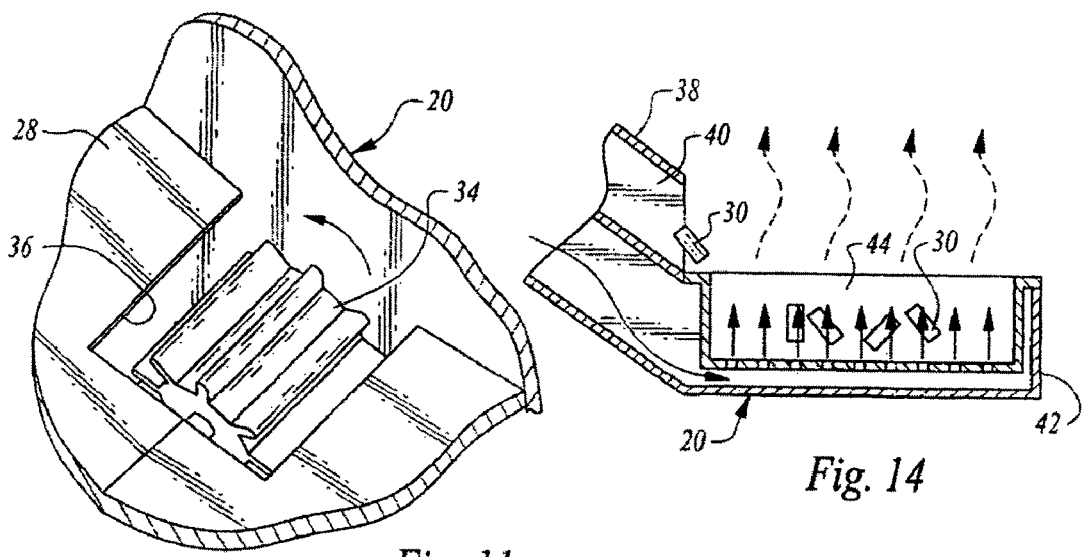
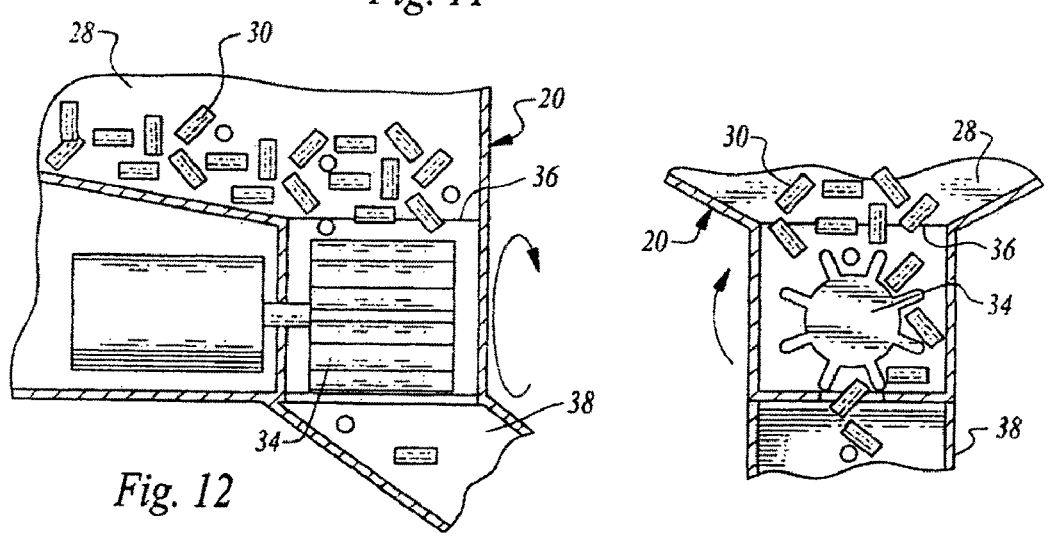
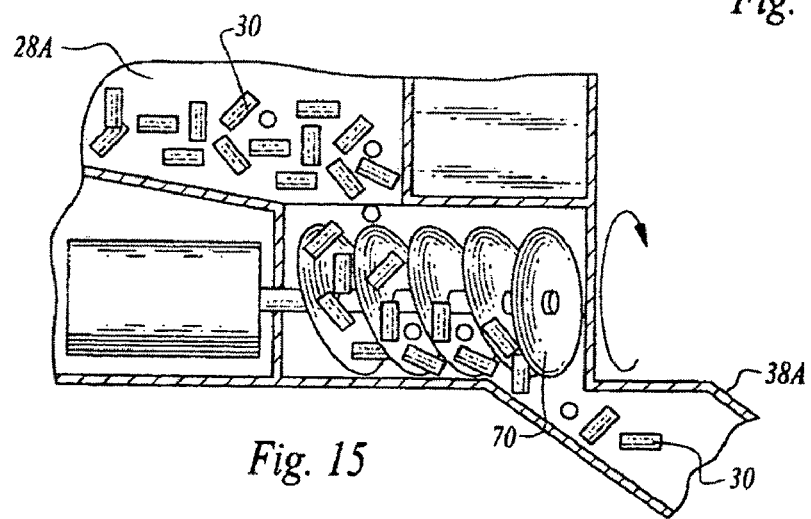

SYSTEM FOR CONVERTING A KETTLE-TYPE BARBECUE TO EMPLOY FUEL PELLETS

CROSS-REFERENCE TO RELATED APPLICATIONS

This application is a continuation-in-part of U.S. application Ser. No. 11/328,985, filed Jan. 10, 2006 now abandoned, which is incorporated by reference as though fully set forth herein.

TECHNICAL FIELD

This invention relates to barbecues, and more particularly to apparatus connectable to a barbecue for delivering fuel pellets to the interior of the barbecue and burning the fuel pellets. The invention also encompasses a method.

BACKGROUND OF THE INVENTION

Kettle-type and other barbecues are well known and conventionally utilize charcoal as a source of heat. The use of gas burners as heat sources is also known.

Charcoal is typically, but not exclusively, employed in the form of briquettes. Whatever form is employed, charcoal has a number of disadvantages, including relatively high expense. It takes considerable time to bring charcoal' briquettes up to heat temperature and they are relatively dirty. Furthermore, charcoal briquettes are difficult to extinguish and reuse, resulting in waste. Gas burners do not impart the desired barbecue flavor to cooked foods due to the lack of smoke characterizing a wood-based fire.

As will be described in greater detail below, the present invention incorporates an apparatus which can be readily employed to modify a conventional barbecue, such as a kettle-type barbecue, to utilize fuel pellets, most typically, wood-based pellets.

Wood-based pellets are becoming increasing popular for household heating use, being employed in stoves and fireplaces.

U.S. Pat. No. 4,823,684 discloses a barbecue specifically designed in its entirety to utilize wood-based pellets as a heat source. The pellet-fired barbecue includes an elevated barbecue pan fired by a pellet-burning pot mounted below the bottom of the barbecue. A heat baffle plate is disposed within the pan above the top of the pot, and a forced-' air mechanism produces movement of heated air within the barbecue.

The arrangement of U.S. Pat. No. 4,823,684 is exclusively adapted and dedicated for use with wood-based pellets and there is no teaching or suggestion whatsoever in U.S. Pat. No. 4,823,684 of an arrangement utilized to convert or retrofit conventional barbecues, such as kettle-type barbecues, for use with fuel pellets; such as wood-based pellets.

A search relating to the present invention—also located the following patent documents which are believed to be further representative of the current state of the art in this field: U.S. Pat. No. 5,251,607, U.S. Pat. No. 595,540, U.S. Pat. No. 740,866, U.S. Pat. No. 364,795, U.S. Pat. No. 4,442,825, U.S. Patent Application Publication No. US 2002/0166460, U.S. Pat. No. 6,173,644, U.S. Pat. No. 4,512,249, U.S. Pat. No. 6,016,797, U.S. Pat. No. 5,018,455, U.S. Pat. No. 6,223,737, U.S. Pat. No. 4,574,712, U.S. Pat. No. 4,787,322 and U.S. Pat. No. 5,144,939.

The above-identified references do not teach or suggest the novel combinations of structural elements and method steps disclosed and claimed herein.

DISCLOSURE OF INVENTION

The present invention encompasses an apparatus for connection to a barbecue to convert the barbecue to use fuel pellets. The apparatus may readily be installed on a barbecue, such as a kettle-type barbecue for example, or removed therefrom, as desired. The user can quickly and easily retrofit an existing standard or conventional barbecue to obtain the convenience and other advantages of fuel pellets.

The apparatus of the present invention is for connection to a barbecue having a barbecue body defining a barbecue body interior for delivering fuel pellets into the barbecue body interior to fuel the barbecue.

The apparatus includes a support positionable on the barbecue body. A hopper is connected to the support for containing fuel pellets.

Feeder structure is connected to the support for delivering fuel pellets from the hopper and discharging the fuel pellets into the barbecue body interior.

The apparatus is of unitary construction and selectively alternatively positionable as a unit on the barbecue body or removable as a unit from the barbecue body.

According to the method of the invention, a support is positioned on the barbecue body. The support is employed to support a hopper for containing fuel pellets adjacent to the barbecue body.

Feeder structure connected to the support is employed to deliver fuel pellets from the hopper and discharge the fuel pellets into the barbecue body interior.

Other features, advantages and objects of the present invention will become apparent with reference to the following description and accompanying drawings.

BRIEF DESCRIPTION OF DRAWINGS

FIG. 1 is a perspective view of a typical, conventional prior art kettle-type barbecue;

FIG. 2 is an exploded, perspective view illustrating the kettle cover and cooking grill and cooking grill of the kettle-type barbecue removed from the kettle body thereof and apparatus constructed in accordance with the teachings of the present invention prior to positioning thereof on the kettle body;

FIG. 3 is a perspective view of the apparatus of the present invention in position on the kettle body, with the kettle cover and a-lid of the hopper of the apparatus both shown in partially open condition to illustrate interior features;

FIG. 4 is a greatly enlarged, cross-sectional view taken along the line 4-4 of FIG. 3;

FIG. 5 is a greatly enlarged, cross-sectional view taken along the line 5-5 in FIG. 7;

FIG. 6 is a greatly enlarged, cross-sectional view taken along the line 6-6 of FIG. 2;

FIG. 7 is a top, plan view of the apparatus positioned on the barbecue with the kettle cover and cooking grill removed;

FIG. 8 is a view similar to FIG. 7, but without the apertured plate of the apparatus in place so that the fire box of the apparatus disposed at the distal end of the discharge chute thereof is illustrated;

FIG. 11 is a perspective view of a selected portion of the apparatus including a rotatable fuel pellet impeller wheel;

FIG. 12 is a side, elevational view of a selected portion of the apparatus, partially in cross-section, showing the rotatable impeller wheel receiving fuel pellets from the hopper;

FIG. 13 is an elevational view showing the impeller wheel as observed when looking toward the end thereof;

FIG. 14 is an enlarged, cross-sectional view illustrating the distal end of the discharge chute and operation of the fire box of the apparatus;

FIG. 15 is a view similar to FIG. 12, but illustrating an alternative embodiment of the invention employing a rotating screw conveyor to deliver fuel pellets from the hopper to the discharge chute;

DETAILED DESCRIPTION

Figure 10:
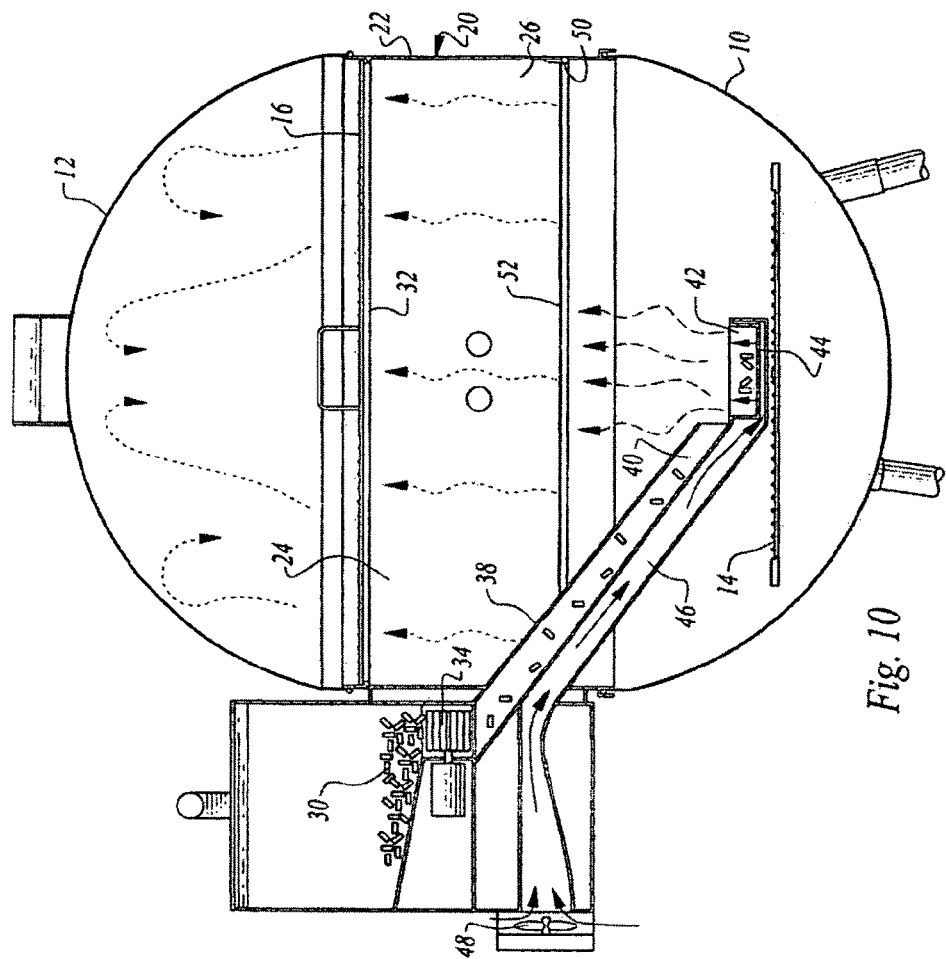
FIG. 10 is a side, elevational view illustrating in schematic fashion cooperative relationships of structural components of the apparatus during operation thereof in combination with the kettle-type barbecue.
Figure 9:
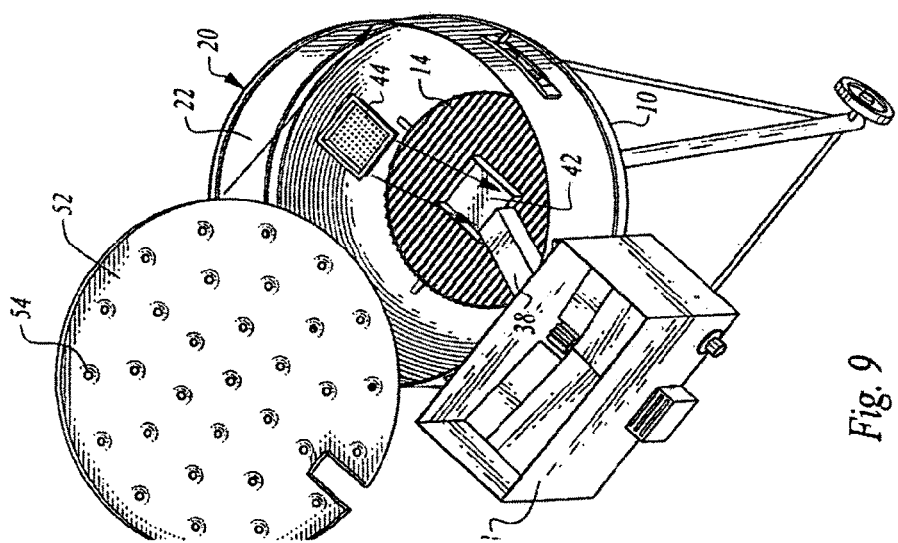
FIG. 9 is a top, perspective view showing the plate removed and the grate of the fire box being installed in position.

FIG. 1 illustrates a conventional kettle-type barbecue including a barbecue body 10 defining a barbecue body interior for holding a conventional barbecue fuel such as charcoal briquettes and a removable. barbecue cover 12. A charcoal briquette support grate 14 conventionally positioned in the barbecue body interior is illustrated in FIG. 2 as is a cooking grill 16 normally positioned at the top of the barbecue body. Although the illustrated kettle-type barbecue is essentially round, it will be appreciated that the present invention may be employed with barbecues of different types and configurations, for example barbecues having an oblong or box-like configuration.

FIGS. 2-14 illustrate a preferred embodiment of apparatus constructed in accordance with the teachings of the present invention, the apparatus being designated by reference numeral 20. As will be seen below, the apparatus is for delivering wood-based or other fuel, pellets into the barbecue body interior to fuel the barbecue 10.

The apparatus includes a support in the form of a circular band 22 defining a band interior and having an upper band portion 24 and a lower band portion 26. In the arrangement illustrated (see FIG. 4) the lower band portion 26 defines a peripherally extending recess 28 which receives the upper periphery of the barbecue body, the band interior being in communication with the barbecue body interior, that is, comprising an upward extension of the barbecue body interior. It will be appreciated that cooking grill 16 is removed as shown in FIG. 2 prior to positioning of the band 22 on the barbecue body. FIG. 2 shows the apparatus in the process of being positioned on the barbecue body and FIG. 3 shows the apparatus 2D in position thereon.

A hopper 28 for containing fuel pellets 30 is connected to band 22 and extends outwardly therefrom as shown so that the hopper is adjacent to the barbecue body.

Also connected to the band 22 is feeder structure for delivering fuel pellets from the hopper 28. and discharging the fuel pellets into the barbecue body interior. The structural combination of the band, hopper and feeder is of unitary construction and selectively alternatively positionable as a unit on the barbecue body or removable as a unit from the barbecue body.

When the apparatus is in position, the barbecue cover 12 is selectively positionable on the upper band portion 24 (see FIG. 10) so that the barbecue cover is disposed above the band interior and the barbecue body interior. It should also be noted that the band 22 is sized and configured to support cooking grill 16 under the barbecue cover, the cooking grill supported by an inwardly directed peripheral flange 32 at the top of the band.

The feeder structure for delivering fuel pellets from the hopper into the barbecue body interior includes a movable impeller in the form of an electric motor driven rotatable impeller wheel 34 located just below an outlet 36 formed at the bottom of the hopper. The impeller wheel when rotated delivers fuel pellets 30 to a downwardly inclined discharge chute 38. The discharge chute has a discharge opening 40 in the barbecue body interior and in communication therewith for discharging the fuel pellets into the barbecue body interior.

Fixedly connected to the discharge chute is an open topped fire box 42 located near the bottom of the barbecue body interior and above barbecue grate 14. Fuel pellets are delivered directly into the fire box onto a removable fire box grate 44 having openings formed therein.

Extending along discharge chute 38 and affixed thereto is an air flow conduit 46 which is utilized to direct air to the fire box under the fire box grate as shown in FIGS. 10 and 14. An electrically powered fan 48 (see FIG. 10) connected to the hopper delivers a stream of ambient air down the air flow conduit 46 and under the fire box grate 44 as shown by the arrows.

It will be appreciated that after fuel pellets 30 are first ignited in the fire box, the fire produced will be kept burning by a supply of fuel pellets from the hopper and chute, the air supplied by fan 48 promoting continued combustion.

Located within the interior of the band 22 at the lower band portion 26 thereof is an inwardly extending ledge 50 which releasably supports a circular plate 52 having a generally planar upper surface. The plate 52 is formed of metal such as steel or other suitable heat transmissive material. When installed, the plate 52 is positioned over fuel pellets 30 in position in fire box 42 within the barbecue body interior. The plate 52 is located under cooking grill 16.

Plate 52 defines a number of spaced apertures 54 allowing for the passage of heated air therethrough from the barbecue body interior. Protrusions 56 are at spaced locations on the plate and project upwardly from the generally planar upper surface thereof as shown with respect to one of the protrusions in FIG. 5. The apertures 54 are defined by the protrusions so that the apertures are located above the generally planar upper surface of the plate.

The plate 52 has an upwardly extending peripheral wall 60 encompassing the spaced protrusions 56 and foaming a grease catch basin around and between the spaced protrusions.

The plate 52 in addition to functioning as a grease collector performs an even more important function. The plate 52 is operable to diffuse flame and distribute heat generated by the fuel pellets in fire box 42 so that the plate is heated in its entirety in a substantially uniform fashion. The plate performs the function of a bed of coals in a standard barbecue and is operable to heat food on the cooking grill by radiant energy. The apertures 54 allow heat and some smoke to pass upwardly from the fuel pellets to impart a barbecue flavor to the meat. Wood-based fuel pellets can be made of different types of wood, each type imparting its own distinctive flavor characteristics to the food on the cooking grill.

In the arrangement illustrated, the band 22 defines an air vent 64, the effective size of which can be adjusted by an adjustable air vent regulator 66 to control heating and cooking. Of course, venting can also be controlled by the vent 68 in the conventional barbecue cover 12.

FIG. 15 shows an alternative embodiment of the device wherein the movable impeller for transporting fuel pellets from a hopper 28A to a discharge chute 38A is a motor driven rotatable screw conveyor 70.

Figure 16:
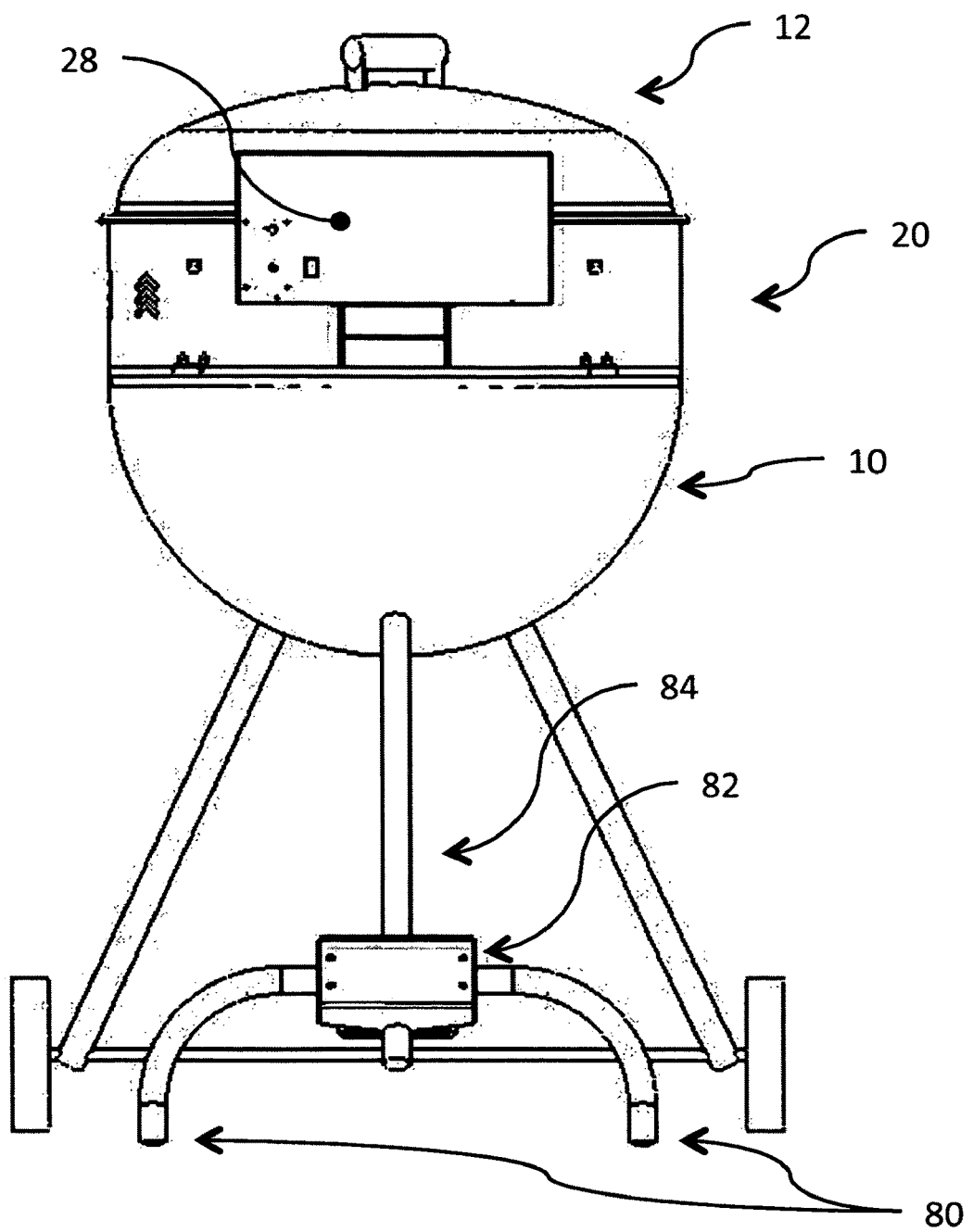
FIG. 16 shows an alternative embodiment of the device that includes a stability adapter that may be attached to one of the legs of the device.

FIG. 16 shows an alternative embodiment of the device that includes a stability adapter 82 that may be attached to one of the legs of the device. In preferred embodiments, the stability adapter 82 is attached to the leg 84 that does not have wheels and typically supports the pellet feeding mechanism 28.

In some devices, this "third leg" may provide more stability for the device as the wheeled legs are typically inset more inward than the third leg, and therefore the third leg projects outward farther than the wheeled legs.

For increased lateral stability, a pair of legs 80 may be provided and arranged in a generally tangential arrangement with respect to the circumference of the kettle, thereby providing additional stability to lateral or horizontal forces. As can be appreciated from FIG. 16, a two-legged attachment essentially turns the typical three-legged kettle support system into a four-legged support system.

It is also contemplated that the stability adapter 82 may also be configured to be secured at a desired height position along the leg 84, and rotated to align the legs 80 of the stability adapter 82 at a desired angle, thereby providing additional stability on uneven surfaces, and helping to insure a level flame and even cooking environment. It is contemplated that a wide variety of means for releasably attaching the stability adapter 82 to the leg 84 may employed for providing different leg configurations and stability options.

Figure 17:
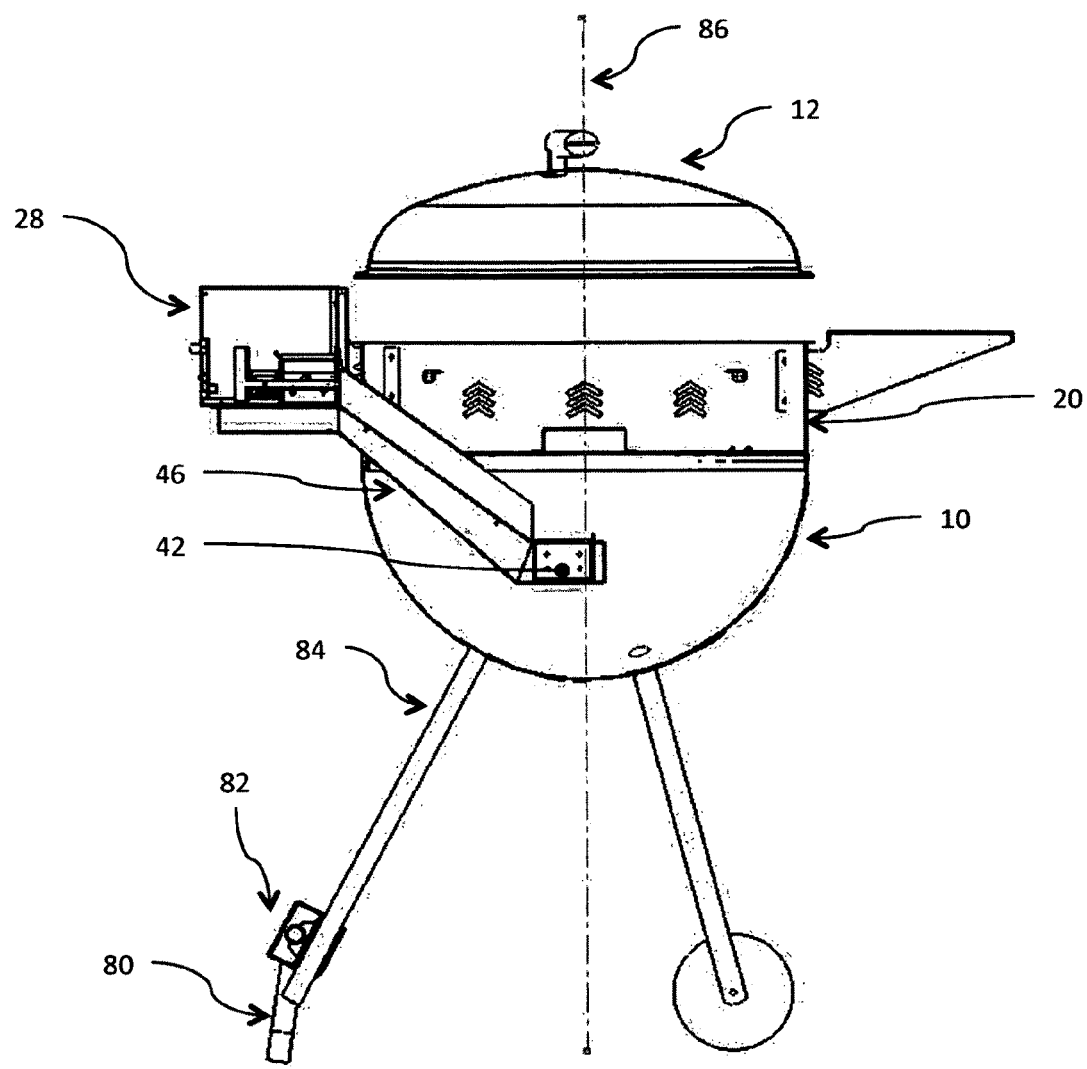
FIG. 17 is a side view of a barbeque apparatus illustrating a preferred location of a fire box in accordance with one aspect of this disclosure.
Figure 18:
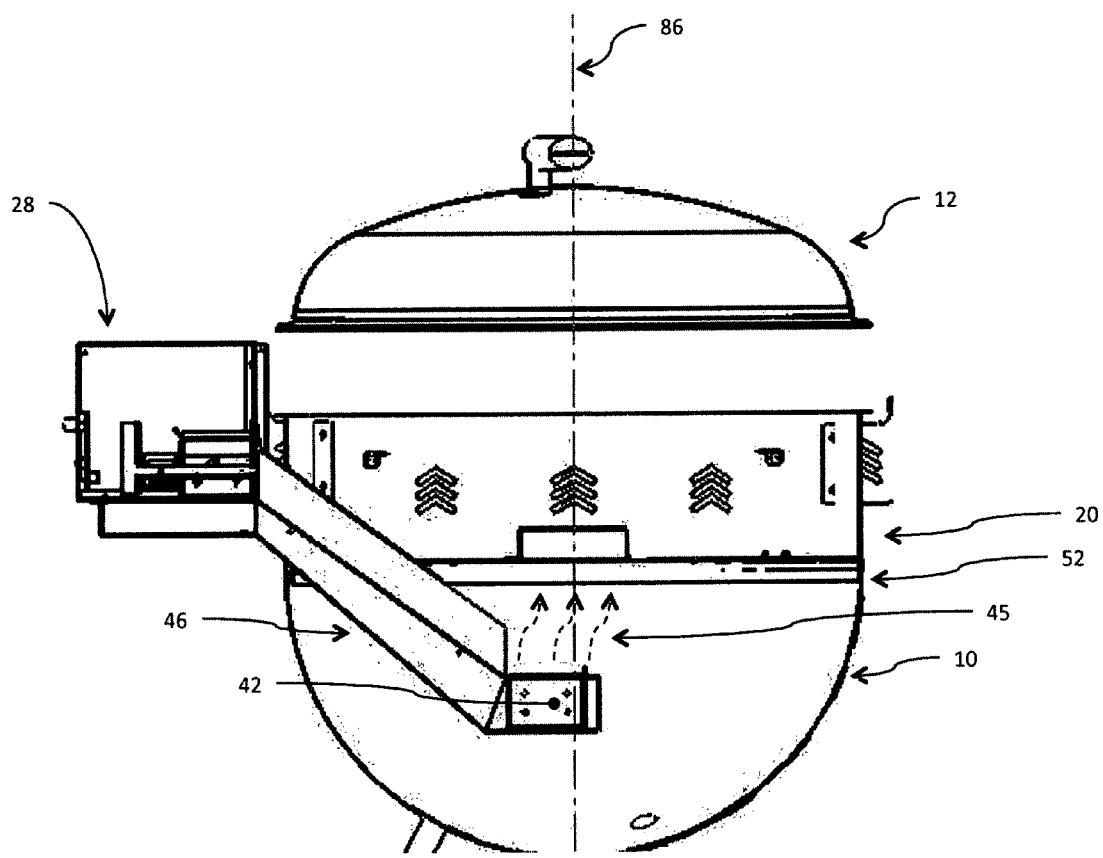
FIG. 18 is a close-up side view of a barbeque apparatus illustrating a preferred location of a fire box in accordance with one aspect of this disclosure.

FIG. 17 is a side view of a barbeque apparatus illustrating the preferred location of the fire box 42 in accordance with one aspect of this disclosure. In embodiments utilizing the air flow conduit 46 to force air into the fire box 42, it is contemplated that the fire box 42 may be positioned to direct the thermal cooking energy to a particular location to achieve desired cooking results. In the embodiment of FIG. 17, the fire box 42 is shown being located off-center, but adjacent relative to the axis 86 that defines the center of the barbeque apparatus.

Referring now to FIG. 17, a close-up side view of a barbeque apparatus is shown, further illustrating the placement of the fire box 42 within the interior of the apparatus. As can be seen from FIG. 17, the fire box is located such that the air flow from the conduit 46 forces the heat energy (illustrated as thermal waves 45) to heat the center of the plate 52. It is contemplated that heating the portion of the plate centered about axis 86 will result in a more predictable and even cooking environment within the interior of the apparatus. It is further contemplated that the exact location of the fire box relative to the target heating area of the plate may be determined by factors such as the air flow volume provided by the conduit, the distance the fire box 42 is located below the surface of the plate 52. The type of fuel utilized may be taken in account as well.

In the embodiment illustrated, the fire box is positioned so as to direct the heat to the center of the plate 52. However, it is contemplated that the fire box may be positioned so as to heat any desired portion of the plate 52. For example, it is contemplated that it may be desired to heat one half of the plate more than the other half, to allow cooking different types of foods on the same plate.

In embodiments disclosed herein, the apparatus has been shown as being positioned on a typical kettle-type barbecue base. However, it is contemplated that the disclosed apparatus may be used separately from a kettle-type barbecue apparatus. For example, the disclosed apparatus may be used to cook by positioning the apparatus using the ground as a base. In such an embodiment, the a hole may be formed in the ground by digging a hole of sufficient size and shape to provide clearance for the air conduit and fire box.

In further embodiments, a structure formed from non-flammable materials such as common bricks to support the apparatus. For example, a structure formed by arranging bricks in a staggered, circular, fashion may be utilized to support the apparatus. In such an embodiment, three elevations of bricks on a non-flammable surface (concrete, sand, dirt, etc.) may be arranged in an octagon-shaped configuration, thereby providing the proper number of bricks to meet the minimum diameter to support the apparatus. The brick base may then be utilized as a support instead of a kettle base.

It is contemplated that fuels other than pellets may be utilized in the disclosed apparatus. For example crushed charcoal crumbs may be employed instead of pellets as a fuel source. In such embodiments, the heat diffuser plate may be eliminated to provide for a more direct heat as charcoal accumulates a greater ash content and provides a lower BTU with this technique.

While embodiments and applications of this invention have been shown and described, it will now be apparent to those skilled in the art having the benefit of this disclosure that many more modifications than mentioned above are possible without departing from the inventive concepts disclosed herein.

The invention claimed is:

1. Apparatus for connection to a barbecue having a barbecue body defining a barbecue body interior for delivering fuel pellets into said barbecue body interior to fuel said barbecue, said apparatus comprising, in combination:
   a support positionable on said barbecue body, said support comprising a cylindrical band formed about an axis;
   a hopper connected to said support for containing fuel pellets;
   feeder structure connected to said support for delivering fuel pellets from said hopper and discharging said fuel pellets into said barbecue body interior;
   said feeder structure comprising a discharge chute for discharging said fuel pellets into said barbecue body interior and into a removable fire box grate;
   an air conduit extending along discharge chute for directing air under said fire box grate; and
   wherein said fire box grate and said air conduit are positioned within said barbeque body interior at a position not on said axis so as to direct heat provided by the combustion of said fuel pellets to a location on said axis within said barbeque body interior.

2. The apparatus according to claim 1 being of unitary construction and selectively alternatively positionable as a unit on said barbecue body or removable as a unit from said barbecue body.

3. The apparatus according to claim 2 wherein said barbecue additionally comprises a barbecue cover removably connectable to said barbecue body, the support of said apparatus being selectively positionable between said barbecue body and said barbecue cover with said support disposed on said barbecue body and said barbecue cover disposed on said support.

4. The apparatus according to claim 3 wherein said support comprises a band defining a band interior and having an upper band portion and a lower band portion, said lower band portion extending along an upper periphery of said barbecue body when disposed on said barbecue body with said band interior in communication with said barbecue body interior.

5. The apparatus according to claim 4 wherein said upper band portion is engageable by said barbecue cover to support said barbecue cover with said barbecue cover disposed above said band interior and said barbecue body interior.

6. The apparatus according to claim 5 wherein said band is a circular band.

7. The apparatus according to claim 4 wherein said band defines an air vent.

8. The apparatus according to claim 4 additionally comprising a cooking grill supported by said band and extending across said band interior.

9. The apparatus according to claim 8 additionally comprising a plate supported by said band and disposed under said cooking grill.

10. The apparatus according to claim 9 wherein said plate is positionable over fuel pellets in said barbecue body interior, burning of the fuel pellets in said barbecue body interior operable to heat said plate under said cooking grill, and said plate operable to diffuse flame and distribute said heat along substantially the entirety thereof, and said plate further operable to heat food on said cooking grill by radiant energy.

11. The apparatus according to claim 10 wherein said plate defines a plurality of spaced apertures allowing for the passage of heated air therethrough from said barbecue body interior.

12. The apparatus according to claim 11 wherein said plate has a generally planar upper surface and spaced protrusions projecting upwardly from said generally planar upper surface, said protrusions defining said apertures.

13. The apparatus according to claim 12 wherein said plate additionally has an upwardly extending peripheral wall encompassing said spaced protrusions and forming a grease catch basin between said spaced protrusions.

14. The apparatus according to claim 1 wherein said feeder structure comprises a movable impeller, said movable impeller for engagement with fuel pellets contained by said hopper and operable to deliver said fuel pellets to said discharge chute.

15. The apparatus according to claim 14 wherein said movable impeller comprises a rotatable impeller wheel.

16. The apparatus according to claim 14 wherein said impeller comprises a conveyor.

17. The apparatus according to claim 16 wherein said conveyor is a rotatable screw conveyor.

18. The apparatus according to claim 7 additionally comprising a fire box connected to the discharge chute for receiving and supporting fuel pellets exiting said discharge opening.

19. The apparatus according to claim 18 additionally comprising air delivery structure supported by said support for delivering air to said fire box.

20. The apparatus of claim 1, wherein said barbeque body comprises a plurality of downward facing legs.

21. The apparatus of claim 20, further comprising a stability adapter releasably attached to one of said legs, said stability adapter providing an additional point of support for said barbeque body.

* * * * *